United States Patent [19]
Viadana

[11] 3,752,622
[45] Aug. 14, 1973

[54] DEVICE FOR MOULDING SINTERING BLANKS

[75] Inventor: Sergio Viadana, Cremona, Italy

[73] Assignee: Ing. C. Olivetti & C., S.p.A., Ivera, Torino, Italy

[22] Filed: Sept. 21, 1971

[21] Appl. No.: 182,352

[30] Foreign Application Priority Data
Sept. 22, 1970 Italy.............................. 70185 A/70

[52] U.S. Cl..................... 425/78, 425/354, 425/411, 425/444, 425/450, 425/DIG. 35, 425/DIG. 58
[51] Int. Cl............................ B29c 7/00, B29c 3/00
[58] Field of Search...................... 425/78, 352, 354, 425/330, 411, 438, 444, 450, 804, DIG. 35, DIG. 58

[56] References Cited
UNITED STATES PATENTS
| | | | |
|---|---|---|---|
| 2,482,342 | 9/1949 | Hubbert et al.........................| 425/78 |
| 2,360,528 | 10/1944 | Talmage................. | 425/DIG. 58 UX |
| 1,475,032 | 11/1923 | Shrum et al............ | 425/DIG. 58 UX |
| 1,609,460 | 12/1926 | Buttles................................... | 425/78 |
| 2,570,989 | 10/1951 | Seelig.............................. | 425/354 X |
| 3,020,589 | 2/1962 | Maritano......................... | 425/354 X |

*Primary Examiner*—Robert L. Spicer, Jr.
*Attorney*—Birch et al.

[57] ABSTRACT

A device for moulding blanks with undercut parts to be sintered by compaction of powdered material. A two part die forms the chamber in which the blank is moulded. A pair of opposed punches pass through the die to compact the powdered material. The two parts of the die are held firmly in contact with one another during the stroke of the punches by an annular collar with inclined surface engaging oppositely inclined surfaces on the die. After the material has been compacted, the two parts of the die are separated in such a direction as not to interfere with the undercut portions of the blanks. After the die has opened, one of the punches retracts while the other continues its stroke to move the blank from between the two parts of the die.

10 Claims, 12 Drawing Figures

Patented Aug. 14, 1973  3,752,622

DEVICE FOR MOULDING SINTERING BLANKS

BACKGROUND OF THE INVENTION

This invention relates to a device for moulding blanks to be sintered and is suitable for moulding blanks with undercut parts which prevent removal of the blanks from the dies by axial displacement. For instance, the device may be used for moulding blanks with a least one central part whose cross section, perpendicular to the axis, is smaller than the cross sections of both adjacent parts.

The prior art shows a device for moulding blanks to be sintered which comprises two cylindrical and/or prismatic parts of different cross section, united in correspondence with a horizontal plane which is perpendicular to the direction of their longitudinal axis. This device essentially comprises a pair of punches movable one towards the other in a direction perpendicular to the aforementioned plane and an assembly of two adjacent dies, normally in contact with one another, each of which is associated with one of the punches and is adapted for moulding one of the parts. The axes of the punches and the dies mentioned above are vertical and the powdered material is fed to the upper die when the punch associated therewith is lifted from the die. Suitable means are provided for moving the punches one towards the other in order to compact the powdered material and to form the blank. One of the two dies is axially movable relative to the other in a direction perpendicular to the said plane with a stroke which is at least equal to the height of the blank. During the stroke, a portion of the blank is removed from one of the dies; further, the punch associated with the other die is axially movable relative to the latter with a stroke which is at least equal to the height of the remaining part of the blank in order to remove this part from the corresponding die.

The device of the kind described does not, however, permit moulding of blanks with undercut parts which prevent removal of the blanks from the dies solely by axial displacement inside the dies. For instance, with a device of this kind it is impossible to mould blanks having a necked-in middle part. A device of this kind also does not allow moulding of twisted or warped blanks, warped blanks having at least one part wherein each section perpendicular to the central axis of the piece is equal to the preceding one but is rotated through a certain angle relative to the same.

The prior art also shows devices for moulding blanks of plastics material, particularly of thermoplastic material, by means of which it is possible to obtain pieces of highly complicated shape. Such devices essentially comprise at least one die whose surface is equal to that of the blank to be obtained and inside which one or more punches of suitable shape are disposed. The molten thermoplastic material is injected (by injection moulding) inside the die and then removed from the same upon solidification. In order to allow removal of the blank from the die, the die normally comprises a number of parts which can be displaced relative to each other, both in the direction of the axis of the blank and in the direction perpendicular thereto.

However, the devices of the kind described above only permit moulding of blanks by injection of molten thermoplastic material inside the corresponding die; these pieces are fully finished when they are removed from said die. Therefore, this technique is quite different from that to which the device in accordance with the present invention relates. In fact, in the device of this invention the compaction of powdered material provides a semifinished blank having the shape of the finished piece, but which must be subjected to other processing steps subsequent to removal of the semifinished blank from the device.

SUMMARY OF THE INVENTION

The purpose of the present invention is to provide a device for moulding blanks to be sintered by compaction of powdered material, so as to allow moulding of pieces with undercut parts which prevent removal of the pieces from the corresponding dies solely by the axial displacement of the same inside the dies and, in particular, moulding of twisted or warped pieces.

According to the present invention, there is provided a device for moulding blanks to be sintered, by compaction of powdered material, comprising two punches movable one towards the other and partially inside a die in which a blank is moulded. The die comprises at least two parts. Means are provided for holding the die parts in contact with one another during compaction in correspondence with at least one plane which is parallel to the direction along which the punches move. Means for separating the die parts after compaction are also provided.

BRIEF DESCRIPTION OF THE DRAWINGS

The invention will be described in more detail, by way of example, with reference to the accompanying drawings, in which.

DESCRIPTION OF THE PREFERRED EMBODIMENT

Figure 1:
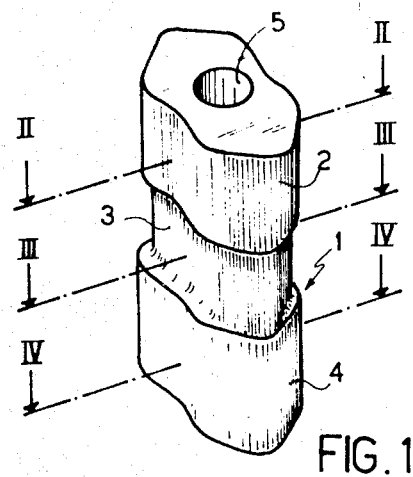
FIG. 1 shows a perspective view of a blank having a middle part of dimensions different from those of the end parts.
Figure 2:
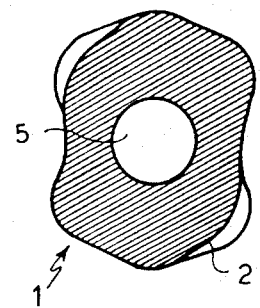
FIG. 2, shows a cross section of the blank of FIG. 1, taken along line II—II.
Figure 3:
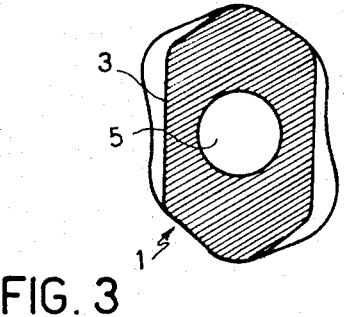
FIG. 3 shows a section of the piece illustrated in FIG. 1, taken along line III—III.
Figure 4:
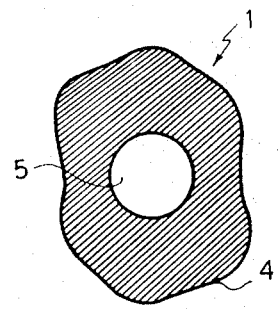
FIG. 4 shows a section of the piece illustrated in FIG. 1, taken along line IV—IV.

In FIGS. 1 to 4 there is shown, by way of example, a blank to be moulded by compression of powdered material by the moulding device. The blank 1 comprises three cylindrical parts 2, 3 and 4 of constant cross section, as seen in FIGS. 2, 3 and 4 respectively; the blank is further provided with an axial hole 5. The blank forms an assembly of three coaxial cams.

The blank 1 could not be formed with known moulding devices, such as, for instance the one described above, by means of which it is only possible to form pieces comprising two substantially cylindrical and/or prismatic parts of different cross section, united to each another at a plane perpendicular to the direction of the longitudinal axis of the blank. In fact, since the dimensions of the section of the middle part 3 are smaller than those of the sections of the end parts 2 and 4, the piece 1 cannot be formed by means of a device which only comprises two or more adjacent dies one or more of which are movable relative to the others in a direction perpendicular to the planes of union of the parts 2, 3 and 4 of the blank 1. In this instance, the end parts 2 and 4 would form two undercuts, thereby preventing withdrawal and removal of the blank from the die (or a portion thereof) which forms the intermediate part 3.

Figure 8:
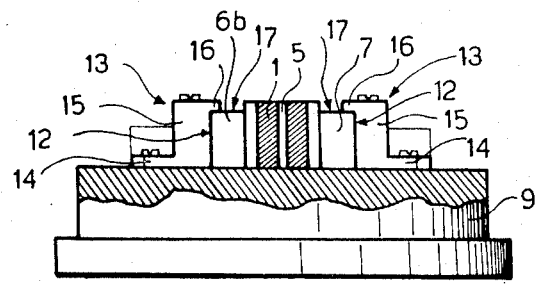
FIG. 8 shows partial section of the parts of the device of FIG. 7, taken along the line VIII—VIII.

A moulding device embodying the present invention comprises a die 6 (FIGS. 5 to 12) composed of two parts 6a and 6b, which are normally held in contact with each other touching over a vertical meridian plane 7 (FIGS. 7 and 8) of the die. The two parts 6a and 6b of the die 6 enclose a recess 8 (FIGS. 5,6,9,11 and 12) whose surface corresponds substantially to the outer surface of the blank 1 which is to be formed therein.

A stationary plate 9, of substantially circular shape, includes a seat 11 on whose surface the parts 6a and 6b of the die 6 are positioned. These parts can be displaced, relative to each other, in a direction substantially perpendicular to that of the vertical plane 7. Each part of the die has a pair of parallel planar side faces 12 (FIGS. 7, 8 and 10) cooperating with guides 13 which ensure a correct movement of the parts in the aforementioned direction. The guides 13 (FIG. 8) are substantially L-shaped and are each provided with an attachment part 14 adapted to be secured on the surface of the seat 11, a vertical wall 15, and a tab 16 which overlies the upper surface 17 of a part 6a, 6b of the die 6.

Each part 6 a and 6 b of the die 6 is further provided with a recess 21 (FIGS. 7 and 10), inside which a protruding portion 22 (FIGS. 5, 6, 9, 11 and 12) of a movable plate 23 can enter, this plate being displaceable in the direction of the axis of the device. Each of the protruding portions is provided with a pair of inclined flat surfaces 24s and 25s each of which forms a different angle with the vertical plane 7 (FIGS. 7 and 10) of the two parts 6a and 6b of the die and which are adapted to cooperate with corresponding inclined flat surfaces, 24i and 25i respectively (FIGS. 11 and 12) belonging to the plate 9 and to each of the die parts.

Each of the protruding portions 22 is provided, at opposite sides, with two slots 26 whose axis is inclined at a small angle relative to the vertical plane 7. These slots 26 are adapted to interact with two corresponding small rollers 27, each of which is disposed on a side surface of the recess 21 (FIGS. 7 and 10) and is rotatable about a corresponding pin 28 fastened to one of the die parts 6a, 6b, respectively.

The plate 23 (FIGS. 5, 6, 9, 11 and 12) is carried by another plate 30 (shown in dashed lines), which is movable in the direction of the axis of the device and guided, for instance, by means of a pair of columns or posts, not shown. To drive the plate 30 an oscillating lever 31 can be provided, which is pivoted to the bedplate of the device (not shown) at 32 and a pin 33 of which acts inside a slot 34 provided in the plate 30, whilst another pin 35 of the lever is adapted to interact with a cam 36 which is integral with a revolving shaft 37. A helical spring 38 causes the lever 31 to rotate in an anticlockwise direction. In the position shown in FIGS. 5 and 6, wherein the flat surface 24s and 25s are in contact with the corresponding surfaces, 24i and 25i respectively (FIGS. 11 and 12), there is a slight clearance between the pin 35 and the active profile of the cam 36.

A pair of compacting punches, namely an upper punch 39 and a lower punch 41, is adapted to move in the direction of the axis of the device and to partially slide inside the recess 8 of the die 6. These punches which have substantially the same cross section as the respective parts of the die 6, pass through the holes 42 and 43 (FIGS. 11 and 12) provided in the movable plate 23 and the stationary plate 9. Preferably, in order to assist the sliding movement of the punches as well as to allow an easy and rapid maintenance of the device, the holes 42 and 43 are not formed directly in the plates 23 and 9, but are in two bushings 44 and 45 secured to the plates.

The axial movement of each of the punches 39, 41 (FIGS. 5, 6, 9, 11 and 12), in the case of the embodiment illustrated, is generated by oscillating levers 46 and 47 pivoted to the bedplate of the device at 48 and 49 and provided with slots 50 and 51 cooperating with corresponding pins 52 and 53 which in turn are fastened to plates 54 and 55 which are axially movable on columns, not shown, and integral with collars of the punches 56 and 57 respectively. These levers are provided with other pins 58 and 59 cooperating with the cams 60 and 61 respectively. The first of these cams is integral with the shaft 37, whilst the second is integral with a shaft 63 which is parallel to the shaft 37 and revolves in the same direction. Two helical springs 64 and 65 normally hold the pins 58 and 59 in contact with the corresponding cams 60 and 61.

A rod 66 is adapted to slide in an axial hole of the punch 41, whilst the punch 39 is provided with another hole 67, inside which the rod can slide. The axial movement of the rod 66 relative to the punches 39 and 41 is generated by an oscillating lever 69 which is pivoted to the bedplate of the device at 69, and is provided with a slot 70 cooperating with a pin 71 of a plate 72 which is movable axially and is integral with a collar 73 of the rod. Another end pin 74 of the lever 68 coacts with a cam 75 which is integral with the shaft 63. A spring 77 normally biases the pin 74 into contact with the cam 75.

A feed duct 78 connected with a hopper (not shown) containing a suitable powdered material, is adapted to be displaced above the upper surface of the plate 23, so as to feed a predetermined amount of the material inside the recess 8 of the die 6. A die-pressing plate 80, also movable axially and driven by the plate 54 through elastic means (not shown), is adapted to exert, during the compaction step, a sufficient force upon the upper surface of the plate 23, substantially as described in our U.S. patent application Ser. No. 174,325, filed Aug. 24, 1971.

Two pins 81 are arranged to slide inside axial holes provided in the plate 9. For clarity only one of these pins is shown in the drawings. Pins 81 are biased upwardly by helical springs 82. These pins are adapted to be inserted, in a manner to be explained below, into recesses 83 provided on the lower surface of each part 6a, 6b of the die.

At the start of the working cycle of the device, the plate 23 (FIG. 5) is in the position corresponding to the end of its downward stroke in contact with the stationary plate 9. In this position, the surfaces 24s and 25s of each protruding portion 22 will coact with the corresponding surfaces 24i and 25i respectively (see FIGS. 11 and 12) of the plate 9 and of one of the parts 6a, 6b of the die respectively.

In the position described above, the punches 39 and 41 are in their end-of-stroke position. The first of the punches leaves the hole 42 (FIGS. 11 and 12) in the plate 23 fully free, whereas the second punch engages the hole 43 in the plate 9. The feed duct 78 (FIG. 5) rests above the plate 23 in such a position as to feed powdered material inside the recess 8 of the die 6. When a predetermined amount of material has been fed, sufficient for completely filling the space defined by the recess 8, the hole 42, the part of the hole 43 left free by the punch 41, and the upper face of the latter, the feed duct 78 is removed.

During the movement described above, the die-pressing plate 80 is brought into contact with the upper surface of the plate 23 (FIG. 6), so as to apply a substantial force to the latter. This force will give rise, in coorespondence with the coupled surfaces 24s, 24i and 25s, 25i, to pressures which are substantially normal to said surfaces. The resultants of these pressures, which act upon each part of die 6a and 6b and are directed perpendicularly to the contact plane 7, will urge the parts against one other with substantial pressure, so that they will resist, without displacement, the high pressures originating inside the recess 8 during the subsequent compacting step of the powdered material.

Figure 6:
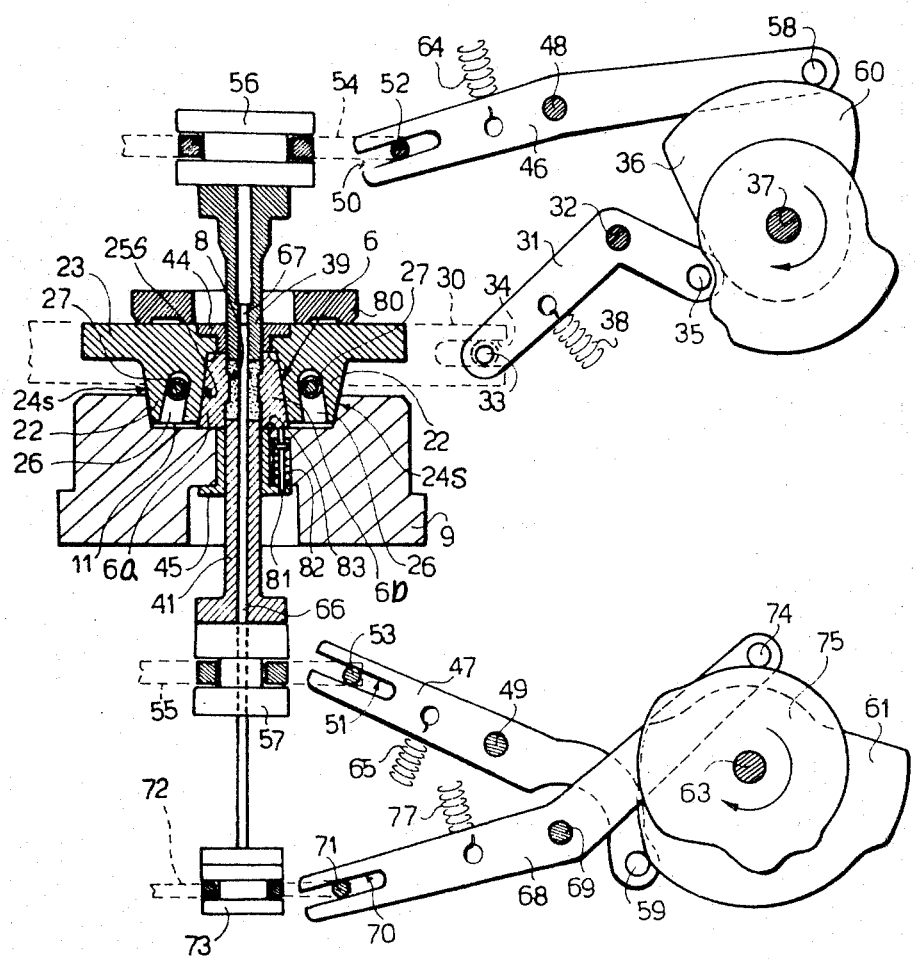
FIG. 6 shows a section of the main parts of the moulding device, at the end of the compaction step of the powdered material.
Figure 7:
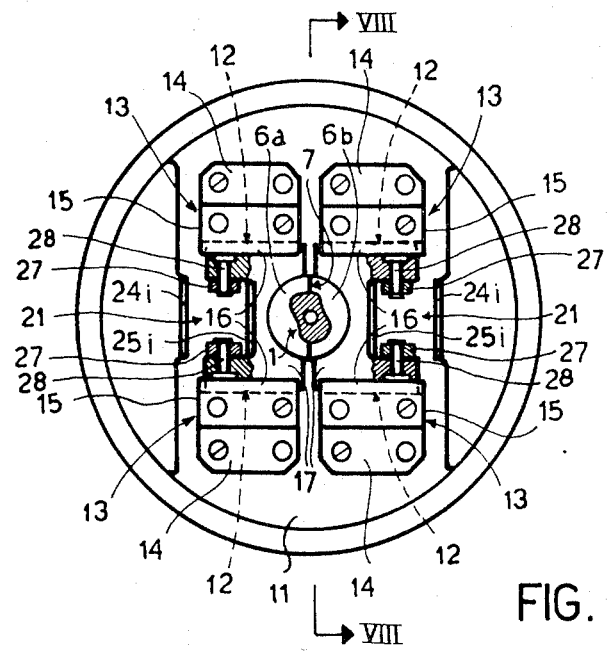
FIG. 7 is a plan view of some parts of the device of FIG. 6.
Figure 10:
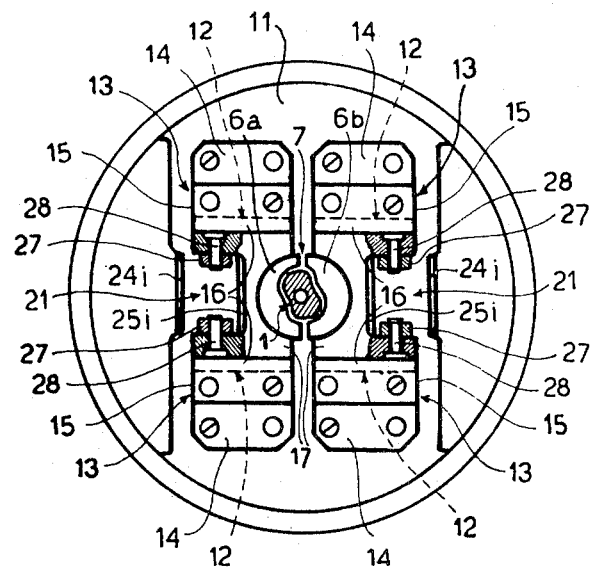
FIG. 10 shows a plan view of some parts of the device of FIG. 9.

Then, the shafts 37 and 53 and the corresponding cams 36, 60, 61 and 75 therewith are caused to rotate in the direction indicated in the drawings. On account of the profiles of the cams, during the first part of their movement of rotation, while the lever 31 remains stationary, the levers 46 and 47 will be moved so as to displace the punches 39 and 41 one towards the other, in order to compact the powdered material contained in the recess 8. As can be seen from the profile of the cams 60 and 61, the punch 39 is moved first, by bringing the same on the edge of the plate 23 and therefore closing off the recess 8. Subsequently, the punches 39 and 41 are caused to move substantially simultaneously according to a velocity law depending on the profile of the cams 60 and 61. During the movement of the punches, rod 66 is held stationary. The position of the various parts of the device at the end of the compaction step by which the blank 1 is formed, is as shown in FIG. 6.

Subsequently, the removal step of the blank formed by the device will start, during which the two parts of the die 6a and 6b, are spaced apart, symmetrically relative to the support plane 7. This is attained when, upon rotation of the cam 36 (FIGS. 9 and 10), the latter will cause the lever 31 to pivot in a clockwise direction and lift the plate 30, and therefore the plate 23 which is integral therewith, as well as the die-pressing plate 80.

Figure 9:
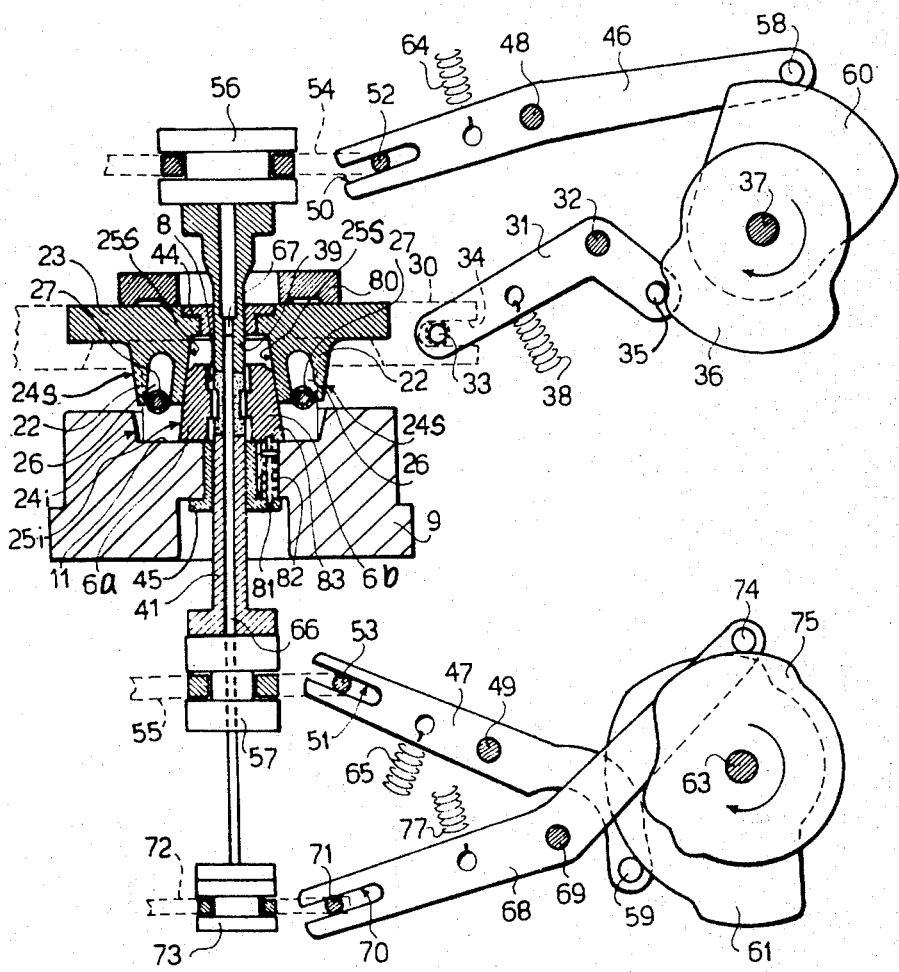
FIG. 9 shows a section of the main parts of the device during the preliminary step of removal of the blank from the device.

During this step, the side walls of each slot 26 in the protruding portions 22 will apply to the corresponding small rollers 27, forces in a direction substantially perpendicular to the side walls, whose components normal to the support plane 7 will space apart the parts of the die, 6a and 6b. While the aforementioned movement is taking place, the parts, being guided by the guides 13 (FIGS. 7 and 8) will slide on the bottom of the seat 11 of the plate 9 and the surfaces of the recesses 8 in the die parts will thus no longer be in contact with the blank 1. The position in which the die parts of the device are at the end of the removal step is shown in FIG. 9. In this position, the parts 6a and 6b of the die will be at the maximum distance from one another, and the pins 81 will snap, under the action of the corresponding springs 82, inside the recesses 83 provided in the bottom wall of each of the parts, thereby resiliently locking the same in the aforementioned position.

Figure 11:
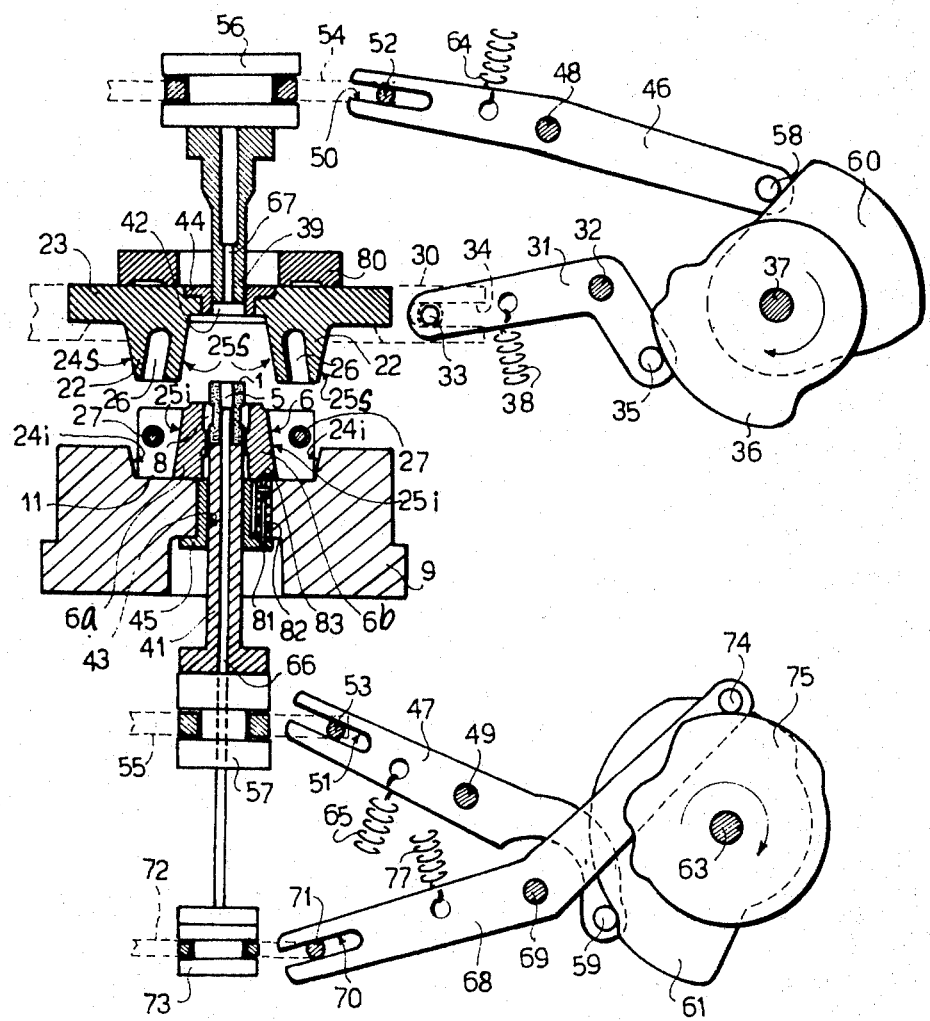
FIG. 11 is a section of the main parts of the device during a further step of removal of the blank from the device.
Figure 12:
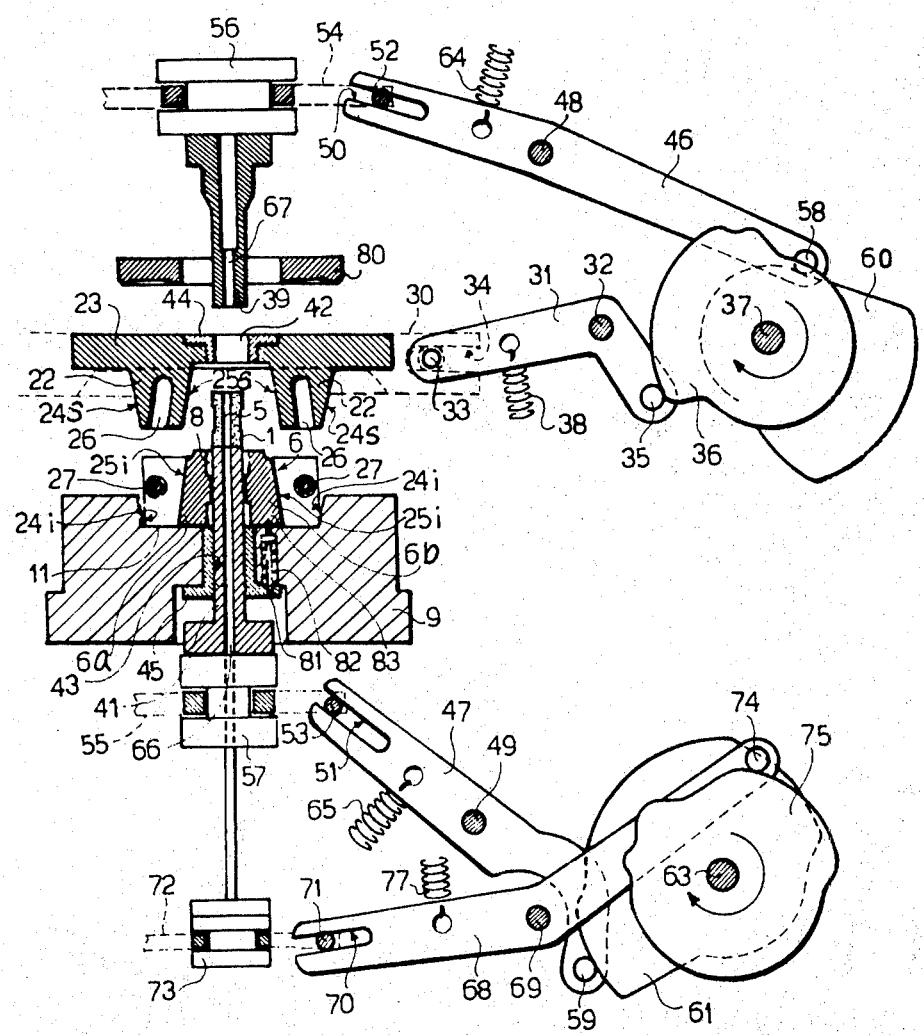
FIG. 12 shows a section of some parts of the device at the end of the step of removal of the blank from the device.

Upon further upward movement of the plate 23, the slots 26 in the protruding parts 22 will abandon the small rollers 27, as shown in FIG. 11. Simultaneously, on account of the rotational movement of the cam 75 which drives the lever 68, the rod 66 will be displaced downwards, until it reaches the position shown in FIG. 11. Upon rotation of the cams 60 and 61 which drive the levers 46 and 47, the upward displacement of the two punches 39 and 41 will start. The punch 41 will now partially lift the blank 1 between the parts 6a and 6b of the opened die, until the lower surface of the latter is brought above the plane of said die. Subsequently, the upward stroke of the punch 39 will continue, untile it reaches the position shown in FIG. 12. In this position, the hole 5 in the blank 1 is fully released from the rod 66 of the die 6 and can therefore be easily removed from the device, hand or with any suitable tool.

Figure 5:
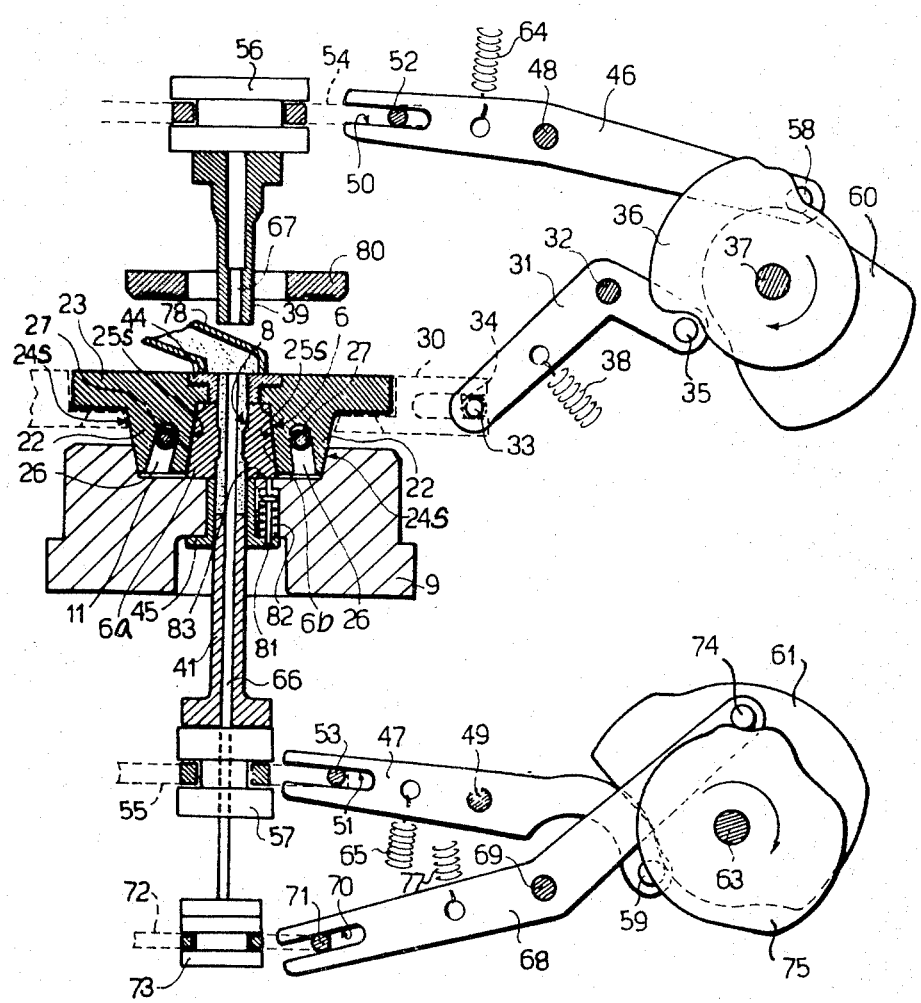
FIG. 5 shows a section of the main parts of a moulding device embodying the invention taken along a diametral plane, at the end of the loading operation of powdered material.

After removal of the blank 1, ahd when the cams of the device have accomplished a complere revolution, the various parts of the same will again take the relative positions shown in FIG. 5 and, therefore, a new working cycle of the device can start. The recesses 83 are so shaped that, when the die parts are urged together again by the action of the rollers 27 in the slots 26, the pins 81 are cammed back into the plate 9.

The device embodying the invention can equally well be utilized for moulding twisted or warped blanks.

Among many possible modifications it may be mentioned that the movement of the punches 39 and 41, as well as that of the plate 30 and the rod 66, can be effected by actuation devices differents from those described and illustrated, e.g. by means of hydraulic cylinders.

I claim:

1. A device for moulding blanks to be sintered by compaction of powdered material comprising:
   a die of at least two parts inside which said blank is moulded, said parts being movable between a moulding position in contact with one another to define a mould cavity in which powdered material can be placed and an open position spaced from one another;
   a pair of opposed punches movable toward one another in a compacting stroke and passing through openings in said die to compact said powered material in said mould cavity, said punches moving along axes parallel to at least one plane of contact of said die parts with one another, means for moving said die parts to said moulding position and for holding said die parts in contact with one another in said moulding position during said compacting stroke of said punches, and means for moving said die parts to said open position at the completion of said compacting stroke of said punches.

2. A device according to claim 1 wherein said planes of contact of said die parts with one another are such that the inner surface of said die defining said mould cavity moves away from or tangent to the surface of said formed blank so as not to interfere with said surface of said formed blank when said die parts are moved from said moulding position to said open position.

3. A device according to claim 1 wherein the line of movement of said die parts between said moulding position and said open position is substantially perpendicular to the axes of said punches.

4. A device according to claim 3 wherein said die parts when in said open position are spaced outwardly from each other a distance sufficient to allow said blank to be displaced along the axes of said punches without interference from said die parts.

5. A device according to claim 1 wherein one of said punches is movable beyond said compacting stroke to eject said blank when said die parts are in said open position.

6. A device according to claim 1 wherein said moving holding means comprises a plate movable axially relative to said punches and provided with first inclined planes, said die having second inclined planes engagable by said first inclined planes to wedge said die parts together, and means for urging said movable plate into engagement with said die.

7. A device according to claim 6 wherein said separating means comprises a plurality of slots in said movable plate inclined with respect to the line of movement of said movable plate, and a plurality of corresponding projections on said die parts, said slots engaging said projections.

8. A device according to claim 7 wherein said first inclined planes and said slots are mounted on extensions attached to said movable plate, said extensions being received during said compacting stroke in corresponding recesses in said die parts.

9. A device according to claim 1 wherein said die parts rest upon a stationary plate having guide means for guiding the movement of said die parts between said moulding position and said open position.

10. A device according to claim 6 wherein the stroke of said movable plate with respect to said stationary plate is at least equal to the height of said moulded blank.

* * * * *